(12) United States Patent
Michel et al.

(10) Patent No.: US 7,878,309 B2
(45) Date of Patent: *Feb. 1, 2011

(54) QUICK RELEASE HAND BRAKE

(75) Inventors: Mark Michel, Greer, SC (US); Robert Shepherd, Pelzer, SC (US)

(73) Assignee: Ellcon National, Inc., Greenville, SC (US)

( * ) Notice: Subject to any disclaimer, the term of this patent is extended or adjusted under 35 U.S.C. 154(b) by 1180 days.

This patent is subject to a terminal disclaimer.

(21) Appl. No.: 11/517,974

(22) Filed: Sep. 8, 2006

(65) Prior Publication Data

US 2007/0056814 A1    Mar. 15, 2007

Related U.S. Application Data

(60) Provisional application No. 60/717,501, filed on Sep. 15, 2005.

(51) Int. Cl.
 *F16D 65/30* (2006.01)
(52) U.S. Cl. ............................. 188/107; 188/33; 74/505
(58) Field of Classification Search .................. 188/33, 188/107, 60, 61; 192/12 R, 13 R, 14; 74/505
See application file for complete search history.

(56) References Cited

U.S. PATENT DOCUMENTS

| | | | | |
|---|---|---|---|---|
| 2,170,238 A | * | 8/1939 | Farmer | 74/505 |
| 3,176,539 A | | 4/1965 | Mersereau | 74/505 |
| 3,453,902 A | * | 7/1969 | La Belle | 74/505 |
| 3,979,969 A | | 9/1976 | O'Brien | 74/505 |
| 3,988,944 A | | 11/1976 | Klasing | 74/505 |
| 4,236,424 A | * | 12/1980 | Kanjo et al. | 74/505 |
| 4,282,771 A | * | 8/1981 | Grube | 74/505 |
| 4,291,793 A | | 9/1981 | Klasing | 74/505 |
| 4,368,648 A | * | 1/1983 | Housman et al. | 74/505 |
| 4,714,142 A | | 12/1987 | Shepherd | 188/185 |
| 5,127,283 A | | 7/1992 | O'Brien et al. | 74/505 |
| 6,325,465 B1 | | 12/2001 | Sommerfield | 303/13 |
| 6,364,428 B1 | | 4/2002 | Labriola et al. | 303/13 |

* cited by examiner

*Primary Examiner*—Robert A Siconolfi
*Assistant Examiner*—Vu Q Nguyen
(74) *Attorney, Agent, or Firm*—Nelson Mullins Riley & Scarborough, LLP (57) ABSTRACT

A brake mechanism comprises a housing, a first handle, a first shaft mounted in the housing having at least one gear rotationally fixed thereon, a second gear rotatably mounted in the housing in operative engagement with the first shaft, a locking mechanism, and a clutch operatively disposed between the first handle and the second gear. The locking mechanism comprises a second shaft mounted in the housing, a second handle rotationally fixed to the second shaft, a first pawl rotatably received on the second shaft and in operative engagement with the first shaft at least one gear, and a second pawl having a first portion in operative engagement with the first pawl and a second portion. The clutch is in engagement with the second pawl second portion and is moveable between a first position in which the first shaft is rotationally coupled to the second gear and a second position in which the second gear rotates with respect to the first shaft.

18 Claims, 8 Drawing Sheets

QUICK RELEASE HAND BRAKE

CLAIM OF PRIORITY

This application claims priority to U.S. Provisional Patent Application No. 60/717,501, filed Sep. 15, 2005, the entire disclosure of which is incorporated by reference herein.

BACKGROUND OF THE INVENTION

This invention relates to hand operable brake mechanisms and particularly, to a hand brake mechanisms for railway cars.

Railway car hand brake mechanisms are well known and usually include a large, rotatable hand wheel mounted on a shaft which, through a gear train, can rotate a chain gear to apply tension on a chain that is secured at its distal end to a brake rigging of the railway car. As the hand wheel is rotated in a first direction (apply mode) the brakes are applied. To prevent rotation of the hand wheel in the second opposite direction, chain tension is opposed by a pawl that engages a ratchet wheel on the hand wheel shaft. Rotation of the hand wheel in a second opposite direction (release mode) is allowed by a clutch mechanism on the ratchet wheel.

The railway car brake may also be released by disengaging the pawl from the detent wheel ("quick release"), but this would cause rapid rotation of the hand wheel and the gears of the gear train. To avoid rapid rotation of the hand wheel, hand brake mechanisms have been devised which are known as "non-spin release" mechanisms and which include releasable connecting gears between the hand wheel shaft and the gear train. When the connecting gears are released, the gears of the gear train rotate rapidly, without constraint by the pawl and ratchet wheel, and the hand wheel remains stationary.

"Quick release" mechanisms use a handle to disconnect the gears between the hand wheel shaft and the gear train allowing the brake to release. However, if the quick release handle is allowed to return to the unreleased position, the gear shaft and gear train may be inadvertently reengaged before the brake fully releases. Therefore, in conventional quick release mechanisms, the operator must hold the quick release handle in the release position long enough to ensure that the brake fully releases.

SUMMARY OF THE INVENTION

The present invention recognizes and addresses the foregoing disadvantages, and others, of prior art constructions and methods.

The present invention provides a brake mechanism for connecting to the brake rigging of a railway car. The brake mechanism comprises a housing, a first handle and a first shaft mounted in the housing and coupled to the first handle. The first shaft has a first gear rotationally fixed thereon and a pinion gear rotatably received thereon. A second gear is rotatably mounted in the housing in operative engagement with the pinion gear, the second gear being coupled to the railway car brake rigging by, for example, a chain.

A locking mechanism is mounted in the housing and is in operative engagement with the first shaft first gear. The locking mechanism comprises a second shaft mounted in the housing, a second handle rotationally fixed to the second shaft such that rotation of the second handle causes the second shaft to rotate, a first pawl rotatably received on the second shaft, the first pawl being biased into engagement with the first shaft first gear so that the first pawl rotationally fixes the first shaft first gear in a first direction and ratchets over the first shaft first gear in an opposite second direction, and a second pawl having a first portion and a second portion, the first portion biasing the first pawl into engagement with the first shaft first gear.

A clutch is operatively disposed between the first shaft first gear and the first shaft pinion gear and has a driver, at least one clutch plate disposed between the driver and the first shaft first gear, a pinion gear axially fixed and rotatably received on the first shaft, a coupler positioned intermediate the pinion gear and the driver, the coupler being rotationally fixed and axially moveable with respect to the driver. The first shaft may be threaded on an outer circumference thereof and the driver may be threaded on an inner circumference thereon so that the two parts may be threadedly engaged with one another so that the driver moves axially with respect to the first shaft over a limited distance. The coupler rotationally locks the pinion gear to the driver in a clutch first position and disengages the pinion gear from the driver in a clutch second position. A spring is disposed between the coupler and the driver to bias the coupler into engagement with the pinion gear. In the clutch first position, the first shaft first gear is rotationally coupled to the first shaft pinion gear and in the clutch second position the first shaft pinion gear rotates with respect to the first shaft. The second handle can be rotated causing the coupler to move from the first position to the second position and is releasably retained in the second position by the second pawl second portion.

The brake mechanism further comprises a spring coupled to the second pawl second portion. The second pawl second portion is in contact with the first pawl and biases the first pawl into engagement with the first shaft first gear. Thus, the first pawl rotationally locks the first shaft first gear in a first direction while ratcheting over the first shaft first gear in an opposite second direction.

The brake mechanism further comprises a bell crank mounted proximate said locking mechanism. The bell crank is in operative engagement with the second handle so that when the second handle is rotated, the locking mechanism biases the bell crank into engagement with the coupler to move the coupler into the second position.

Other objects, features and aspects of the present invention are provided by various combinations and subcombinations of the disclosed elements, as well as methods of utilizing same, which are discussed in greater detail below.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
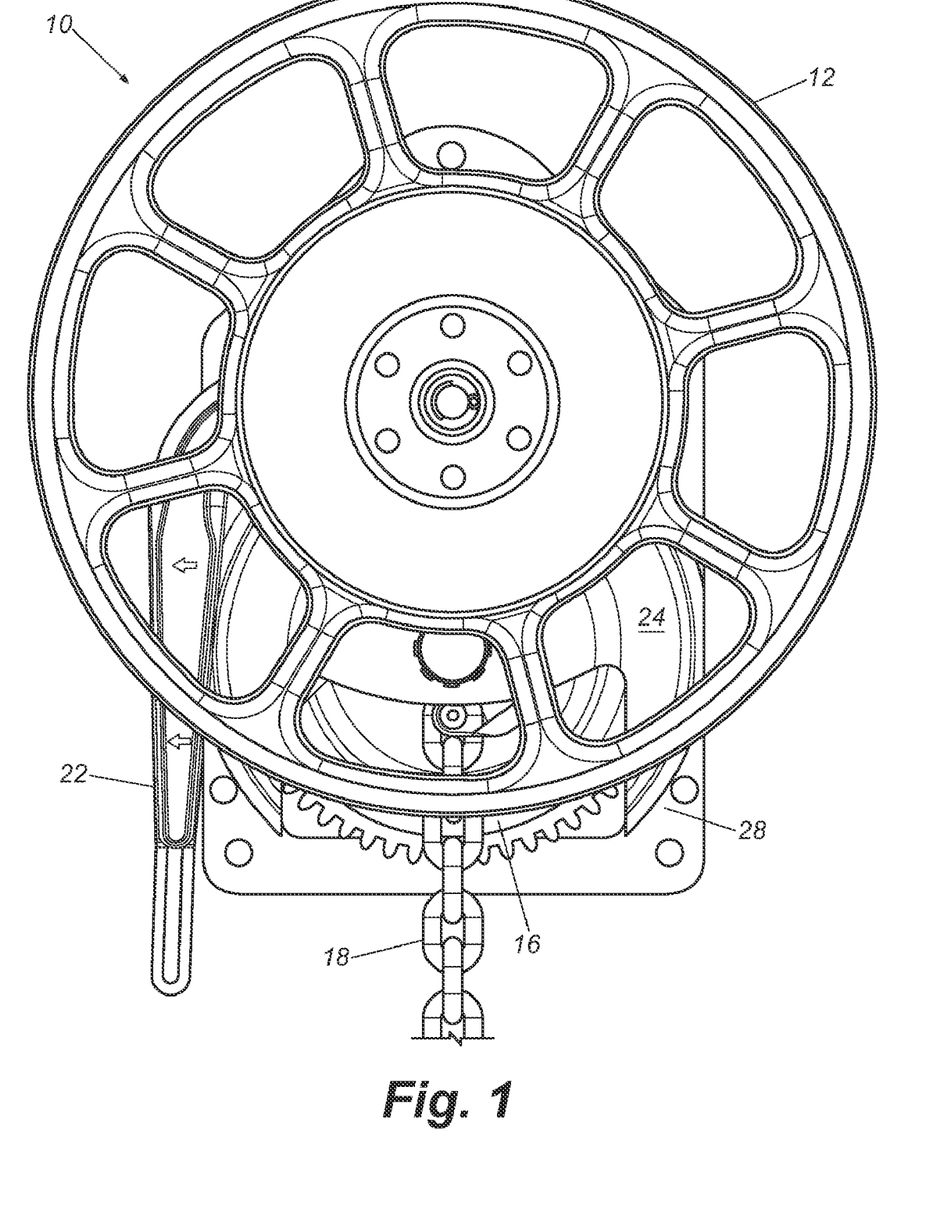
FIG. 1 is a front view of the hand brake mechanism of the present invention.
Figure 2:
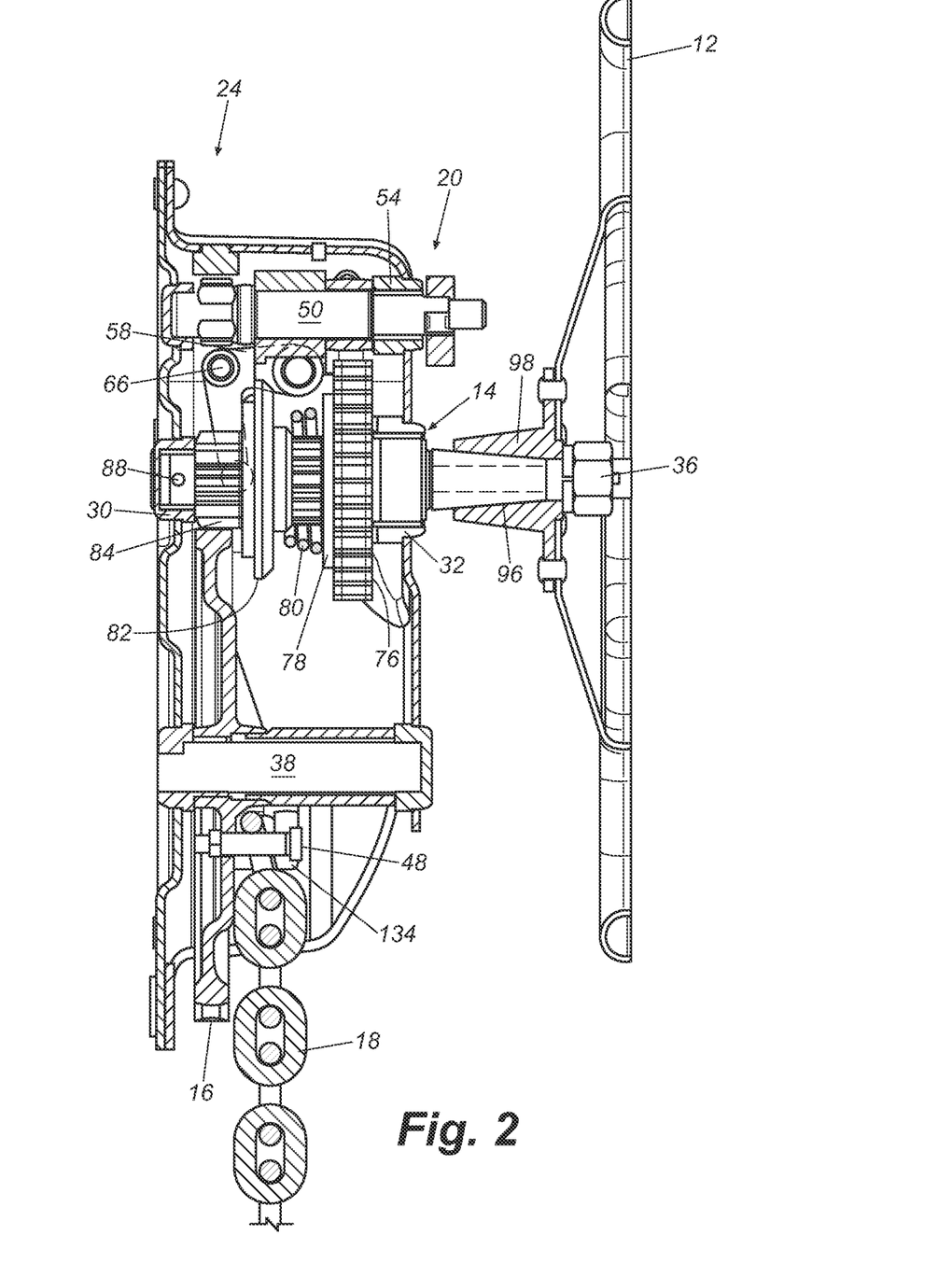
FIG. 2 is a side view, in partial cutaway, of the hand brake of FIG. 1.
Figure 3:
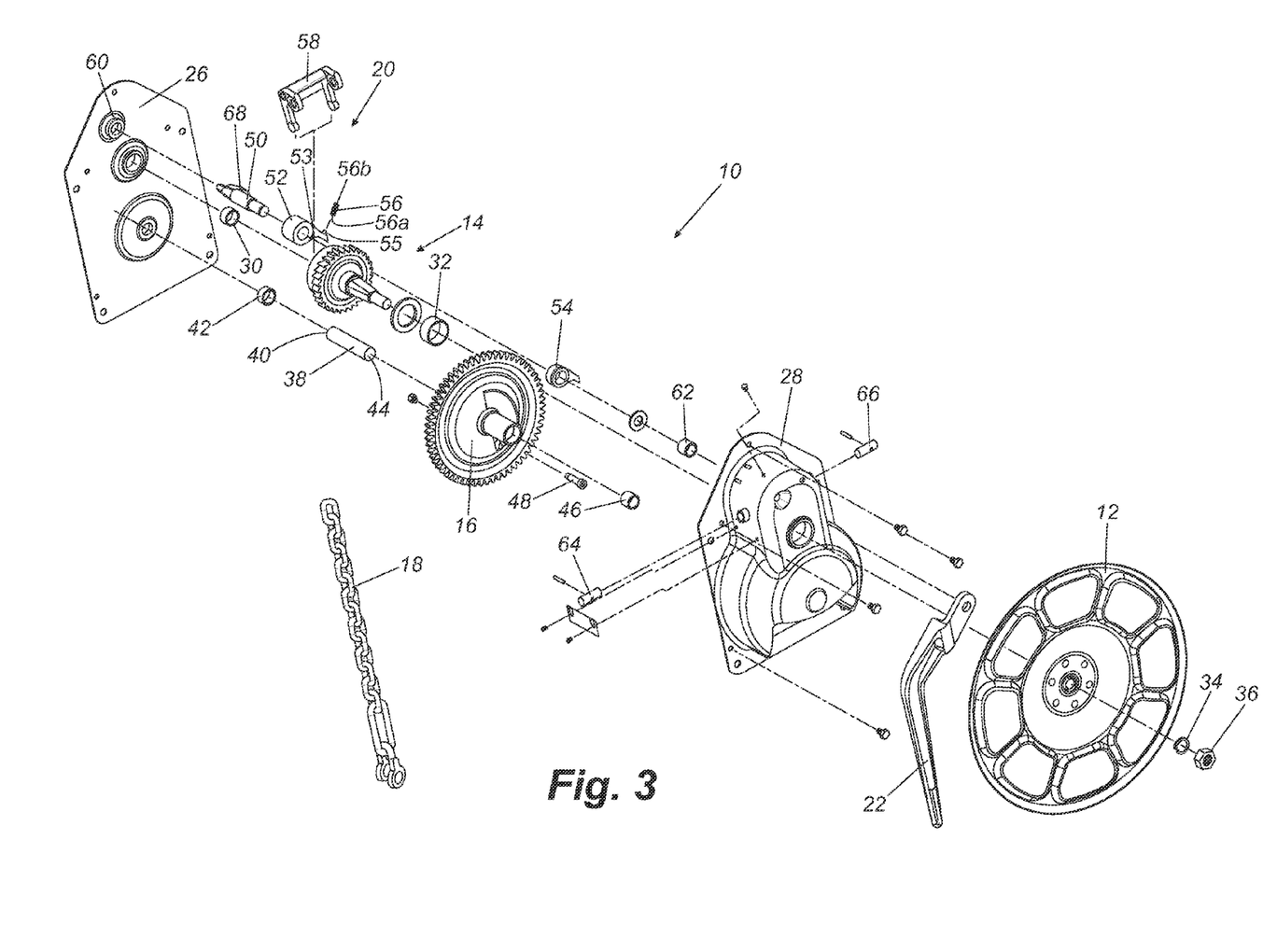
FIG. 3 is an exploded perspective view of the hand brake of FIG. 1.

Referring to FIGS. 1, 2 and 3, a brake mechanism 10 generally comprises a handle 12, a geared shaft generally designated 14, a gear 16, a chain 18, a locking mechanism generally denoted 20, a release handle 22 and a housing 24.

Referring particularly to FIG. 3, housing 24 contains a back plate 26 and a cover plate 28. A first end of geared shaft 14 is received by back plate 26 in a bearing 30 and a second end is received by cover plate 28 by a bearing 32. Handle 12 is a round wheel that is rotationally fixed on geared shaft second end 90 and secured thereon by a washer 34 and nut 36. Gear 16 is rotationally fixed on a shaft 38 that has a first end 40 received by back plate 26 in a bearing 42 and a second end 44 received by cover plate 28 in a bearing 46. Chain 18 is secured to gear 16 by a fastener 48.

Figure 7A:
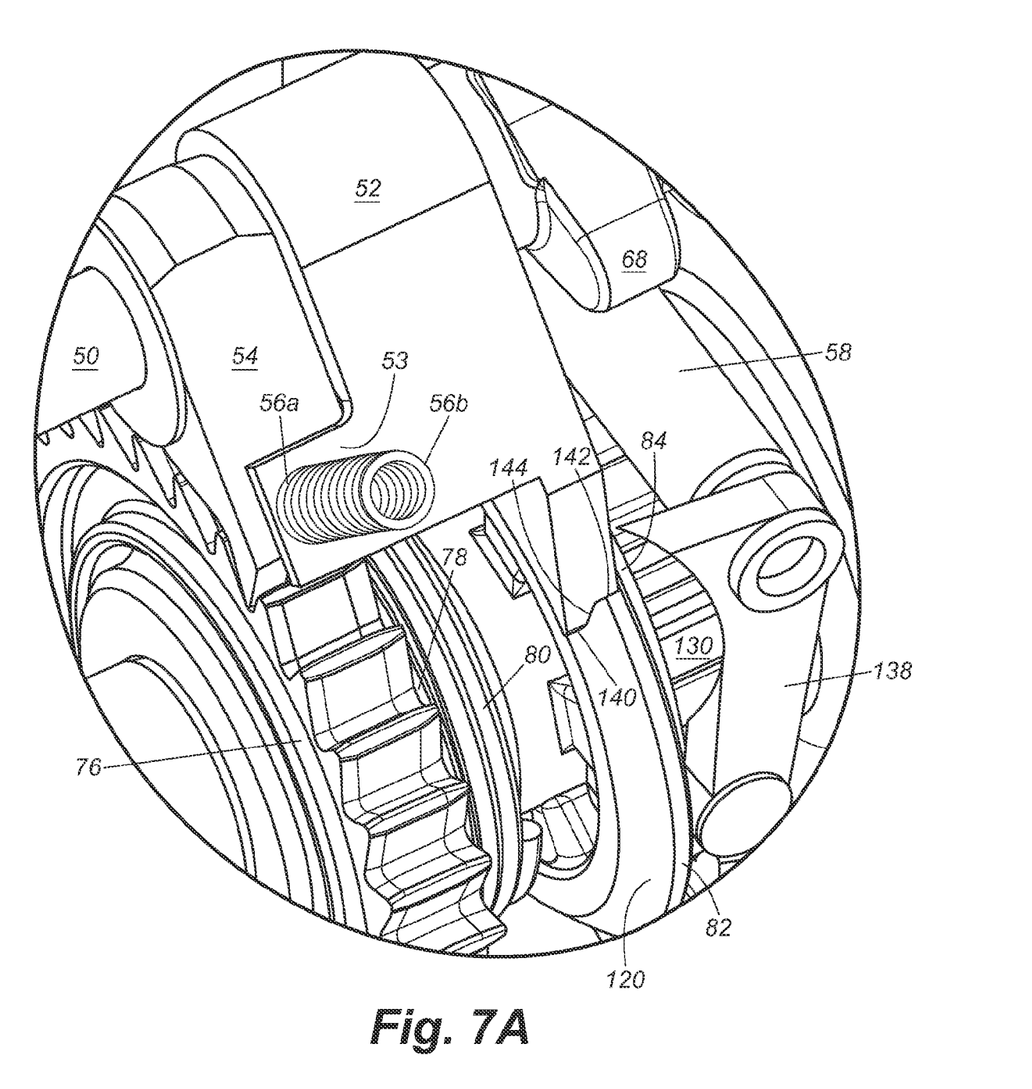
FIGS. 7A and 7B are partial perspective views of the sustained release mechanism used in the hand brake of FIG. 1.

Locking mechanism 20 includes a shaft 50, a sustained release pawl 52, a locking pawl 54, a spring 56, and a bell crank 58. A first end of shaft 50 is received by back plate 26 in a bearing 60 and a second end of the shaft is received by cover plate 28 in a bearing 62. Quick release handle 22 is rotationally fixed to the second end of shaft 50. Bell crank 58 is rotatably secured on pins 64 and 66 perpendicularly with respect to shaft 50. Referring to FIGS. 3 and 7A, a cam 68 formed on shaft 50 is operatively coupled to bell crank 58 so that rotation of shaft 50 causes cam 68 to engage bell crank 58, as further described herein. Sustained release pawl 52 and locking pawl 54 are rotatably received on shaft 50 and are positioned such that a portion 53 of sustained release pawl 52 extends over pawl 54. One end 56a of spring 56 is coupled to a pin 55 (FIG. 3) and the other end 56b is coupled to the inside of front plate 28. The spring functions to bias both the sustained release pawl and the locking pawl about shaft 50 such that the locking pawl engages the teeth on a ratchet wheel 76.

Figure 4:
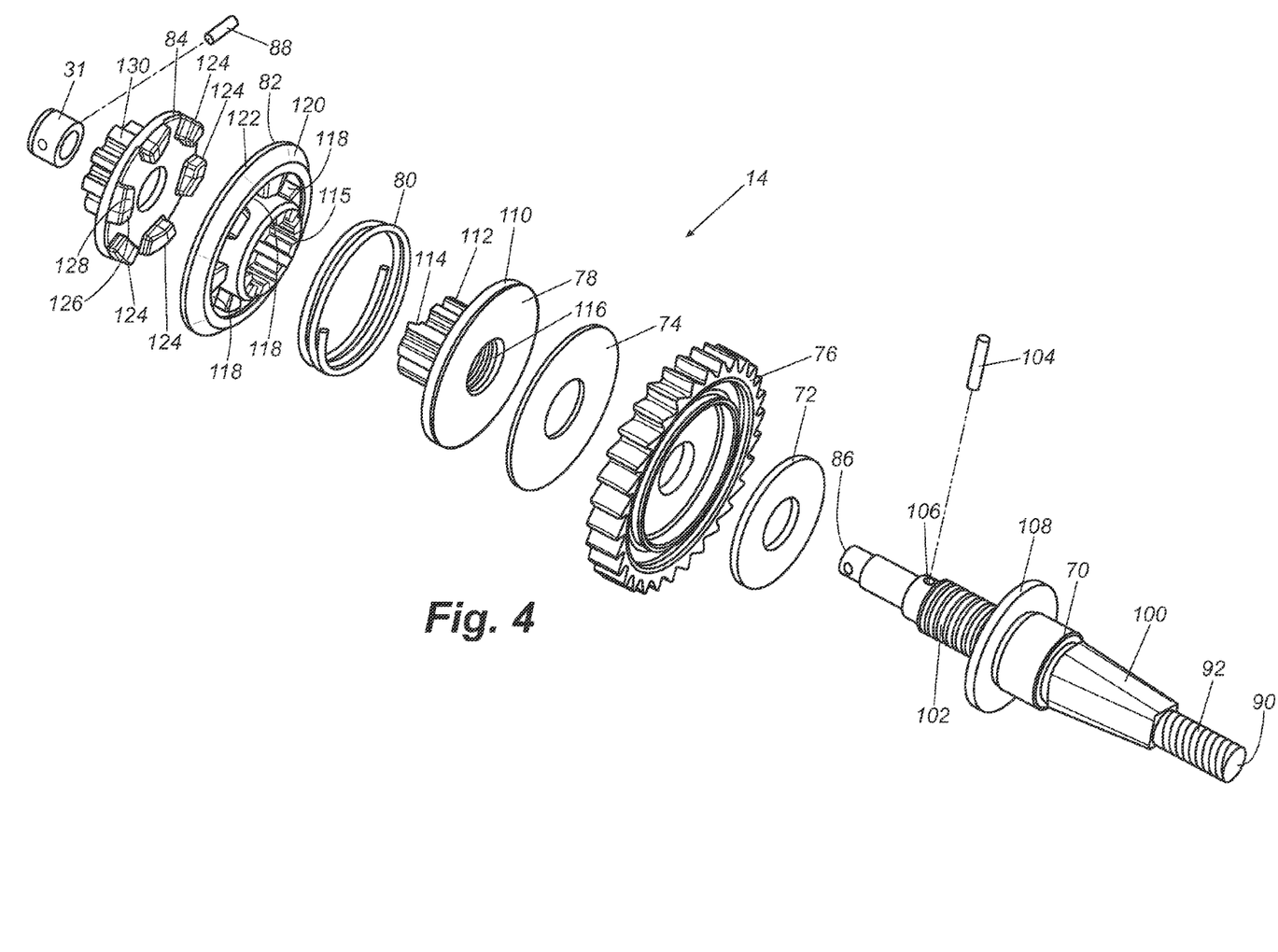
FIG. 4 is an exploded perspective view of the hand brake gear shaft and gear mechanism of FIG. 1.

Referring to FIG. 4, geared shaft 14 includes a shaft 70, clutch plates 72 and 74, ratchet wheel 76, a driver 78, a spring 80, a coupler 82 and a pinion 84. A first end 86 of shaft 70 is generally cylindrical and is received via collar 31 in bearing 30. A pin 88 secures collar 31 to shaft first end 86. A second end 90 of shaft 70 is also generally cylindrical and includes threads 92 that receive nut 36 (FIG. 2) to secure wheel 12 to shaft 70. Wheel 12 includes a polygonally shaped bore 96 (FIG. 2) formed in a hub 98 that receives a polygonally shaped portion 100 of shaft 70. Intermediate polygonally shaped shaft portion 100 and shaft first end 86 is a threaded shaft portion 102. A pin 104 is received in a blind bore 106 that acts as a stop as described in greater detail herein. A radial extending flange 108 is coupled to shaft 70 intermediate polygonal portion 100 and threaded portion 102. Flange 108 can be formed apart from shaft 70 and rotationally fixed to the shaft or it may be integrally formed on the shaft.

Clutch plate 72 is rotatably received on shaft 70 intermediate flange 108 and ratchet wheel 76. Ratchet wheel 76, like clutch plate 72, is rotatably received on shaft 70. Clutch plate 74 is rotatably received on shaft 70 intermediate ratchet wheel 76 and driver 78. Driver 78 has a radially extending flange 110, a generally cylindrical splined portion 112 and a stop wall 114. An axially threaded bore 116 formed through driver 78 interengages with shaft threaded portion 102, as described in further detail below. Spring 80 is rotatably received on shaft 70 intermediate driver 78 and coupler 82. Coupler 82 is generally cylindrical in shape and includes a splined bore 115, angularly spaced openings 118 and a beveled surface 120, which is formed adjacent an outer circumference 122. Coupler 82 is rotationally fixed to driver 78 through splines 112 and splined bore 115 but, it is axially moveable with respect to the driver. Pinion 84 is rotatably received adjacent coupler 82, rotationally fixed to coupler 82 via a plurality of drive dogs 124 and coupler 82 is axially moveable with respect to pinion 84. Each drive dog 124 includes a flat top portion 126 and an angled portion 128. Pinion 84 includes a gear 130 that interengages with gear 16 (FIG. 2).

Referring once again to FIG. 2, one end of chain 18 is rotatably coupled to gear 16 by fastener 48 that is received in a clevis 134, which is preferably formed integral with gear 16. Fastener 48 could be any suitable fastener and in one embodiment is a bolt and nut. The distal end of chain 18 is secured to the brake rigging on a vehicle, such as a railway car, in a conventional manner so that when chain 18 is wound about gear shaft 38 the brakes of the vehicle are applied to stop or prevent movement of the vehicle.

Prior to describing the operation of the sustained brake release mechanism, a description of the general operation of the brake mechanism is presented. Beginning with the brake mechanism in the released position with quick release handle 22 positioned so that cam 68 is disengaged from bell crank 58, coupler 82 is biased toward pinion drive dogs 124 through spring 80 so that the drive dogs engage coupler openings 118. The drive dogs and openings rotationally fix the pinion to the coupler so that they rotate in unison. Because pinion gear 130 is interengaged with gear 16, chain 18 exerts a downward force to hold gear 16 in a rotationally fixed position.

Assuming that driver 78 is positioned so that clutch plates 72 and 74 do not rotationally lock the driver to ratchet wheel 76, then movement of wheel 12 in a clockwise direction (as viewed in FIG. 1) will cause shaft 70 to rotate with respect to driver 78 because of the counterforce exerted by gear 16 on coupler 82 through pinion gear 130. Thus, driver threads 116 interengage with shaft threads 102 so that the driver moves axially to the right, (with respect to FIG. 2). It should be understood that as driver 78 moves axially to the right along shaft threads 102, the driver will remain rotationally locked to coupler 82 through the interaction of coupler splines 115 and driver splines 112. Thus continued clockwise rotation of wheel 12 will cause driver 78 to move further to the right until the driver pins clutch plates 72 and 74 between driver 78, ratchet wheel 76 and shaft flange 108. At this point, the ratchet wheel 76, shaft 70, driver 78, coupler 82 and pinion 84 are all rotatably fixed with respect to each other. Thus, continued application of rotational force in a clockwise direction on wheel 12 will cause gear ratchet wheel 16 to rotate so as to apply the brakes on the vehicle. Once the desired amount of force has been applied on chain 18 to properly engage the vehicle brake, pawl 54, which always remains in positive engagement with ratchet wheel 76, prevents the ratchet wheel from rotating in the opposite direction to unnecessarily release the brakes.

Figure 5:
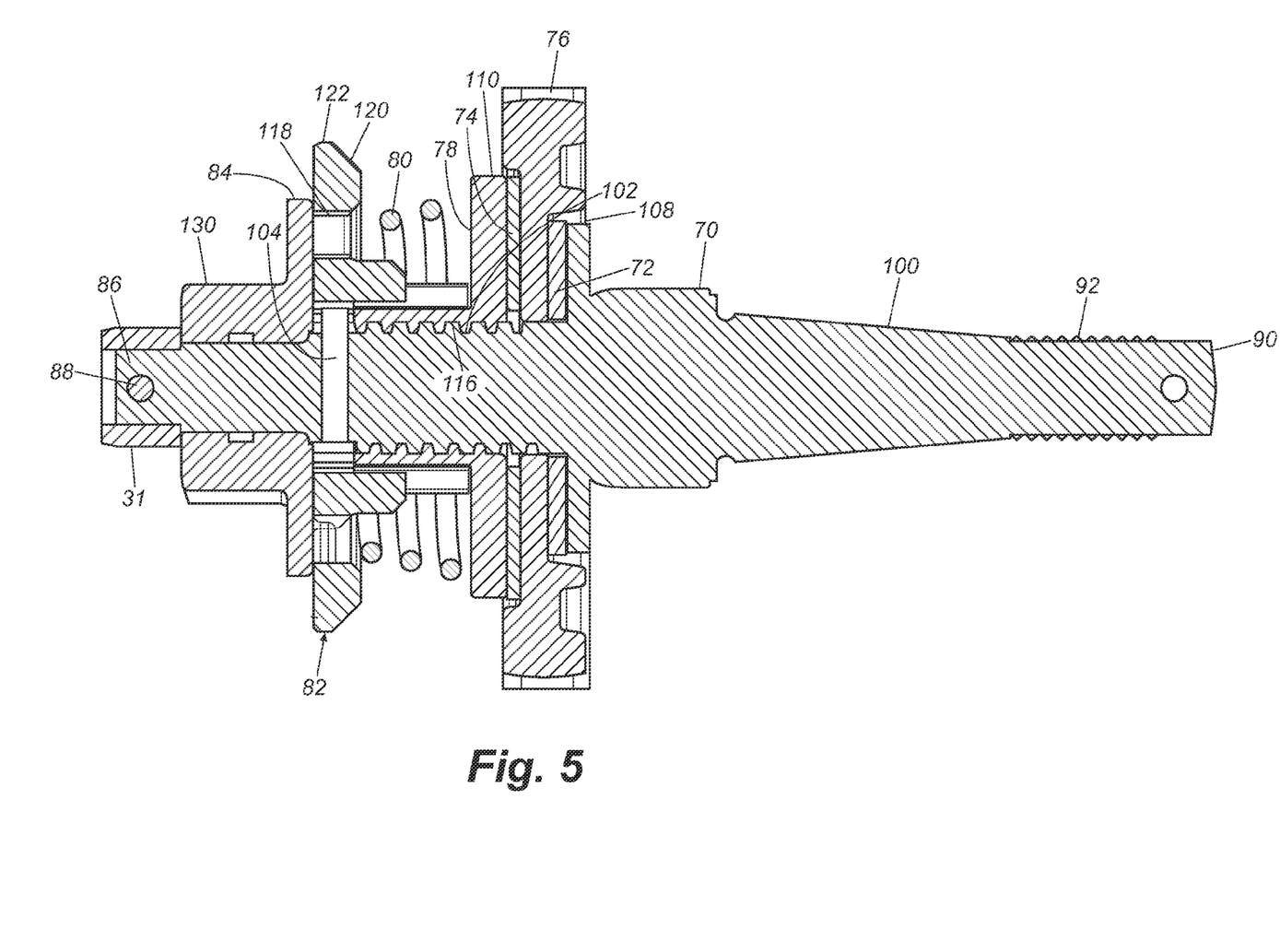
FIG. 5 is a side cutaway view of the hand brake gear shaft and gear mechanism of FIG. 4.

The brake can be released in one of two ways: by rotating wheel 12 in the counterclockwise direction or by rotating quick release handle 22 upward (with respect to FIG. 1) to disengage the coupler from the pinion. To release the brake by the operation of wheel 12, the wheel is turned in a counterclockwise direction (as viewed in FIG. 1). Because pawl 54 prevents ratchet wheel 76 from rotating with the shaft, initially driver 78 is rotationally locked to ratchet wheel 76 (FIG. 4). Thus, the interaction of shaft threads 102 and driver threads 116 causes the driver to move axially to the left (as viewed in FIG. 2) reducing the friction between driver flange 110 and clutch plate 74 (FIG. 5). Once the friction is sufficiently reduced, the force applied to driver 78 by the vehicle brake through gear 16, pinion 84 and coupler 82 cause drive member 78 to rotate in the same direction as shaft 70 relative to ratchet wheel 76.

As long as wheel 12 is rotated in the counterclockwise direction (as viewed in FIG. 1), the brake will continue to be released. However, if wheel 12 is held stationary, gear 16 will continue to rotate over a short distance. That is, the rotational force exerted on gear 16 through chain 18 by the vehicle brake will cause gear 16 to continue to rotate in the clockwise direction (as viewed in FIG. 1). Since shaft 70 is stationary, the counterforce on gear 16 will cause the pinion, coupler and driver to continue to rotate until the driver moves axially to the right (as viewed in FIG. 1) causing the clutch plates to once again rotationally fix driver 78 and ratchet wheel 76 to shaft flange 108. Therefore, in order to release the brake, the hand wheel must be rotated several times in the counter clockwise direction before the brake is considered fully released.

In one embodiment of the invention, pin 104 extending from the shaft 70 is provided to engage with stop wall 114 on driver 78 (FIG. 4) to prevent the driver from reaching the end of shaft threaded portion 102 as wheel 12 is rotate counterclockwise. Preferably, as wheel 12 is rotated counterclockwise and driver 78 moves axially to the left (with respect to FIG. 2), release pin 104 will engage stop wall 114 before the driver reaches the end of the threads to prevent the driver from jamming the coupler against the pinion. After pin 104 engages stop wall 114 the driver is rotationally coupled to shaft 70, and continued counterclockwise rotation of the wheel causes rotation of driver 78, coupler 82 and pinion 84, thereby further releasing the vehicle brake.

Figure 6A:
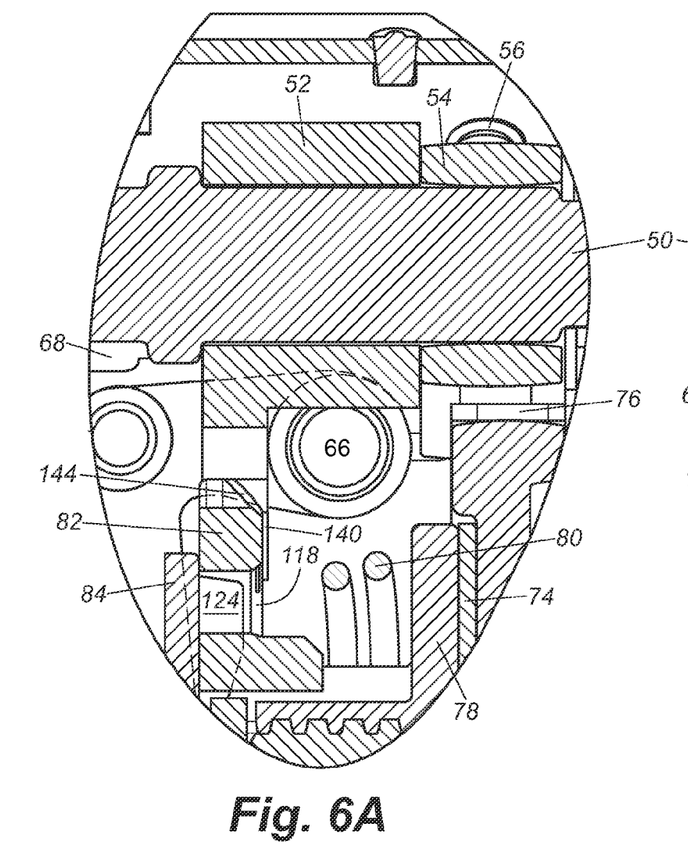
FIGS. 6A and 6B are partial cutaway views of the quick release mechanism used in the hand brake of FIG. 1.
Figure 6B:
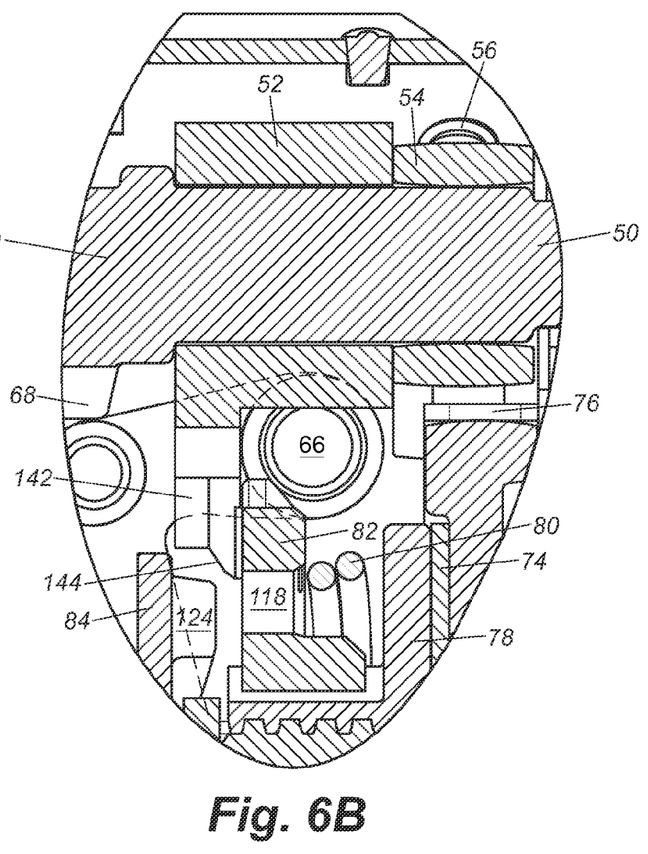

In addition to releasing the brake by rotating wheel 12, the brake may also be released by operation of quick release lever 22 without rotating wheel 12. In particular, and referring to FIGS. 1 and 7A, handle 22 is rotationally fixed on shaft 50 as previously discussed above. Thus, as handle 22 (FIG. 1) is lifted upward, shaft 50 (FIG. 1) rotates clockwise (with respect to FIG. 7) causing cam 68 to engage bell crank 58. That is, arms 138 of bell crank 58 pivot about pins 64 and 66 (FIGS. 2, 3, 6A and 6B) downward against the rear surface of coupler 82. As a result, and referring to FIGS. 6A and 6B, bell crank arms 138 force coupler 82 axially to the right (with respect to FIGS. 6A and 6B) apart from pinion drive dogs 124 into the position shown in FIG. 6B. Because the pinion is rotatably mounted on shaft 70, the counterforce exerted on gear 16 by chain 18 causes pinion 84 to rotate freely in the counterclockwise direction allowing the brake on the vehicle to release. This occurs without rotation of wheel 12 since the pinion is not rotationally coupled to shaft 70 when quick release handle 22 is lifted. Opposite movement of quick release lever 22 moves bell crank arms from against coupler 82 and the force of spring 80 moves the coupler 82 back into engagement with pinion 84 so that the brake mechanism is again operative for applying the brakes, as described above.

Figure 7B:
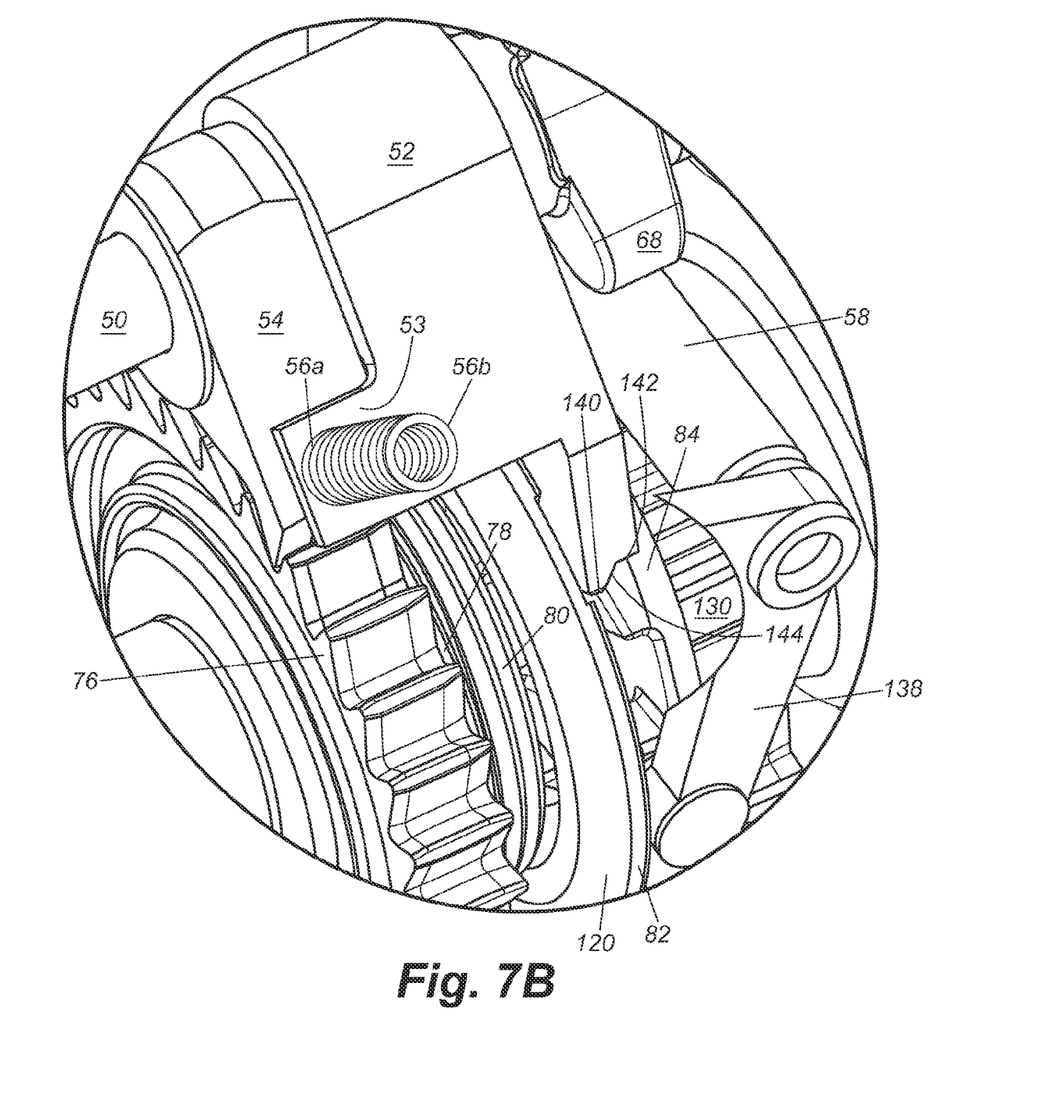

As pointed out in the background, it is advantageous for the operator to use quick release handle 22 to deactivate the brake mechanism quickly, especially in a situations where many vehicle brakes must be deactivated in a relatively short time period. Thus, in order to reduce the time the operator must maintain the release handle in the released position, the present invention uses sustained release pawl 52 (FIG. 7A) to maintain the coupler in the released position after quick release handle 22 returns into downward its normal operating state. As previously described above with reference to FIG. 3, sustained release pawl 52 and pawl 54 are rotatably received on shaft 50. Sustained release pawl portion 53 extends over an end of pawl 54 so that upward movement of pawl 54 over the ratchet wheel teeth causes pawl 52 to also rotate about shaft 50 outward from its resting position. Sustained release pawl 54 generally may be located in one of two positions: the first between driver 78 and coupler 82 (FIG. 7A) and the second between coupler 82 and pinion 84 (FIG. 7B).

Referring to FIG. 7A, sustained release pawl 52 has a first flat edge 140, a second flat edge 142 and an angled portion 144 that connects the two flat edges. Angled portion 144 is sized and shaped to correspond to the angled front surface 120 formed on coupler 82. Thus, during normal operation of brake mechanism 10, pawl 52 is positioned intermediate coupler 82 and driver 78 adjacent to the coupler. As wheel 12 is turned in the clockwise direction to activate the vehicle brake and once the clutch plates rotationally lock ratchet wheel 76 to shaft 70, ratchet wheel 76 turns in the clockwise direction in conjunction with shaft 70 causing pawl 54 to ride over the ratchet wheel teeth. This in turn also causes sustained release pawl 52 to move radially outward against the inward bias of spring 56 so that spring 56 biases pawl 54 back into operative engagement with the ratchet wheel teeth vis-à-vis sustained release pawl portion 53.

If, however, quick release handle 22 is lifted to release the vehicle brake, then bell crank arms 138 rotate downward into engagement with coupler 82 thereby forcing the coupler axially to the left (with respect to FIG. 7A). Consequently, as coupler 82 moves axially to the left, coupler angled surface 120 presses against angled pawl portion 144 causing the pawl to be forced radially outward so that the pawl can ride over coupler surface 120 into its second position, shown in FIG. 7B. Referring to FIG. 7B, sustained release pawl 52 is now positioned intermediate coupler 82 and pinion 84 and spring 56 urges the pawl radially downward into this position. Consequently, if quick release handle 22 is allowed to return to its disengaged state such that cam 68 allows bellcrank arms 138 to move out of engagement with coupler 82, spring 80 will once again force coupler 82 axially to the right (with respect to FIG. 7B). However, coupler 82 will only move axially to the right a very short distance since sustained release pawl 52 is positioned between coupler 82 and pinion 84. As a result, regardless of how quickly the operator allows the release arm to return to the unreleased position, the brake will fully release and the operator is free to move onto the next vehicle. Sustained release pawl 52 therefore maintains the brake mechanism in the quick released state. Furthermore, should the vehicle brake stick in the braking position due to rust that forms when the brake is engaged for a period of time, it can always break free once the vehicle is moved since the braking mechanism is maintained in the quick release position where the coupler is disengaged from the pinion.

To release the sustained release pawl to its first (FIG. 7a) position so that the vehicle brake may be reengaged, the user first ensures that quick release handle 22 is disengaged and then begins to rotate wheel 12 clockwise (with respect to FIG. 1). As wheel 12 is rotated clockwise, driver 78 moves axially to the right (with respect to FIG. 2) along shaft threads 102 until clutch plates 72 and 74 rotationally fix ratchet wheel 76 to shaft 70, at which time ratchet wheel 76 rotates in conjunction with shaft 70. As the ratchet wheel rotates with the shaft, pawl 54 is forced radially outward against the radially inward bias of spring 56 through sustained release pawl portion 53 so that pawl 54 ratchets over the ratchet wheel teeth. As previously discussed, as pawl 54 ratchets over the teeth, pawl 54 also causes pawl 52 to move radially outward because of the coupling between the pawls such that sustained release pawl 52 moves out from between coupler 82 and pinion 84. Once sustained release pawl moves radially outward, spring 80 urges the coupler axially to the left (with respect to FIG. 2) from the position shown in FIG. 7B into engagement with pinion 84, and pawl 52 returns to the position illustrated in FIG. 7A between driver 78 and coupler 82. Once in this position, the operation of brake mechanism 10 operates similar to that described above.

While one or more preferred embodiments of the invention have been described above, it should be understood that any and all equivalent realizations of the present invention are included within the scope and spirit thereof. The embodiments depicted are presented by way of example and are not intended as limitations upon the present invention. Thus, those of ordinary skill in this art should understand that the present invention is not limited to these embodiments since modifications can be made. Therefore, it is contemplated that any and all such embodiments are included in the present invention as may fall within the scope and spirit thereof.

What we claim:

1. A brake mechanism for connecting to a brake rigging of a railway car, said brake mechanism comprising:
   a. a housing;
   b. a first handle;
   c. a first shaft mounted in said housing and coupled to said first handle, said first shaft having at least one gear rotatably received thereon;
   d. a second gear rotatably mounted in said housing in operative engagement with said first shaft;
   e. a locking mechanism mounted in said housing and in operative engagement with said at least one gear, said locking mechanism comprising
      (i) a second shaft mounted in said housing,
      (ii) a second handle rotationally fixed to said second shaft such that rotation of said second handle causes said second shaft to rotate,
      (iii) a first pawl rotatably received on said second shaft and in operative engagement with said at least one gear, and
      (iv) a second pawl having a first portion and a second portion, said first portion being in operative engagement with said first pawl, and
   f. a clutch operatively disposed between said first handle and said second gear,
      said clutch being in operative engagement with said second pawl second portion, wherein said clutch is moveable between
         a first position in which said first shaft is rotationally coupled to said at least one gear and said second gear, and
         a second position in which said second gear rotates with respect to said first shaft.

2. The brake mechanism of claim 1, further comprising a spring coupled to said second pawl first portion, wherein said second pawl is rotatably received on said second shaft so that said second pawl first portion is in contact with said first pawl, and said spring biases said first pawl into engagement with said at least one gear to rotationally fix said at least one gear in a first direction and ratchets over said at least one gear in an opposite second direction.

3. The brake mechanism of claim 2, further comprising a bell crank mounted in said housing proximate said locking mechanism, wherein
   when said second handle is rotated, said bell crank is engaged with said clutch to move said clutch to said second position, and
   said second pawl second portion releasably retains said clutch in said second position.

4. The brake mechanism of claim 1, said clutch further comprising:
   a. a driver;
   b. at least one clutch plate disposed between said driver and said at least one gear;
   c. a pinion gear axially fixed and rotatably received on said first shaft,
   d. a coupler positioned intermediate said pinion gear and said driver, said coupler being rotationally fixed and axially moveable with respect to said driver, said coupler rotationally fixing said pinion gear to said driver in said clutch first position and disengaging said pinion gear from said first shaft in said clutch second position; and
   e. a spring disposed between said coupler and said driver to bias said coupler into engagement with said pinion gear.

5. The brake mechanism of claim 4,
   a. said pinion gear comprising a plurality of drive dogs located proximate said coupler; and
   b. said coupler defining a plurality of openings spaced about said coupler,
   wherein a respective one of said plurality of drive dogs engages a corresponding one of said plurality of openings to rotationally couple said pinion gear to said coupler.

6. The brake mechanism of claim 1, further comprising a chain coupled between said second gear and the brake rigging of the railway car.

7. A brake mechanism for connecting to a brake rigging of a railway car, said brake mechanism comprising:
   a. a first handle;
   b. a first shaft coupled to said first handle, said first shaft having a first gear received thereon;
   c. a second gear rotatably mounted proximate to and in operative engagement with said first shaft;
   d. a locking mechanism mounted proximate to and in operative engagement with said first gear, said locking mechanism comprising
      (i) a second shaft,
      (ii) a second handle rotationally fixed to said second shaft such that rotation of said second handle causes said second shaft to rotate,
      (iii) a first pawl rotatably received on said second shaft and biased into engagement with said first gear,
      (iv) a second pawl having a first portion and a second portion, said first portion being in operative engagement with said first pawl, and
   e. a clutch operatively disposed between said first handle and said second gear, wherein
      said clutch is moveable between a first position in which said first shaft is rotationally coupled to said second gear, and a second position in which said second gear rotates with respect to said first shaft, and when said second handle is rotated, said clutch is moved into said second position and releasably retained in said second position by said second pawl second portion.

8. The brake mechanism of claim 7, further comprising a first spring coupled to said second pawl first portion, wherein said second pawl first portion is in contact with said first pawl and, wherein said first spring biases said first pawl into engagement with said first gear to rotationally fix said first gear in a first direction while ratcheting over said first gear in an opposite second direction.

9. The brake mechanism of claim 7, further comprising a bell crank mounted proximate said locking mechanism, wherein
when said second handle is rotated, said locking mechanism biases said bell crank into engagement with said clutch to move said clutch into said second position,
said second pawl second portion releasably retains said clutch in said second position.

10. The brake mechanism of claim 7, said clutch further comprising:
a. a driver;
b. at least one clutch plate disposed between said driver and said first gear;
c. a pinion gear axially fixed and rotatably received on said first shaft,
d. a coupler positioned intermediate said pinion gear and said driver, said coupler being rotationally fixed and axially moveable with respect to said driver, said coupler rotationally locking said pinion gear to said driver in said clutch first position and disengaging said pinion gear from said driver in said clutch second position; and
e. a second spring disposed between said coupler and said driver to bias said coupler into engagement with said pinion gear.

11. The brake mechanism of claim 10,
a. said pinion gear comprising a plurality of drive dogs located proximate said coupler; and
b. said coupler defining a plurality of openings equiangularly spaced about said coupler,
wherein a respective one of said plurality of drive dogs engages a corresponding one of said plurality of openings to rotationally couple said pinion gear to said coupler.

12. The brake mechanism of claim 7, further comprising a chain coupled between said second gear and the brake rigging of the railway car.

13. The brake mechanism of claim 10, wherein
a. said first shaft is threaded on an outer circumference thereon; and
b. said driver is threaded on an inner circumference thereon,
wherein said driver is threadedly coupled to said first shaft so that said driver moves axially along said shaft threads over a limited distance.

14. A brake mechanism for connecting to a brake rigging of a railway car, said brake mechanism comprising:
a. a housing;
b. a first handle;
c. a first shaft mounted in said housing and coupled to said first handle, said first shaft having a first gear received thereon and a pinion gear received thereon;
d. a second gear rotatably mounted in said housing in operative engagement with said pinion gear, said second gear being coupled to the brake rigging of the railway car;
e. a locking mechanism mounted in said housing and in operative engagement with said first gear, said locking mechanism comprising
(i) a second shaft mounted in said housing,
(ii) a second handle rotationally fixed to said second shaft such that rotation of said second handle causes said second shaft to rotate,
(iii) a first pawl rotatably received on said second shaft, said first pawl being biased into engagement with said first gear so that said first pawl rotationally fixes said first gear in a first direction and ratchets over said first gear in an opposite second direction,
(iv) a second pawl having a first portion and a second portion, said first portion biasing said first pawl into engagement with said first gear, and
f. a clutch operatively disposed between said first gear and said second gear, said clutch having,
(i) a driver;
(ii) at least one clutch plate disposed between said driver and said first gear;
(iii) said pinion gear axially fixed and rotatably received on said first shaft,
(iv) a coupler positioned intermediate said pinion gear and said driver, said coupler being rotationally fixed and axially moveable with respect to said driver, said coupler rotationally locking said pinion gear to said driver in a clutch first position and disengaging said pinion gear from said driver in a clutch second position; and
(v) a spring disposed between said coupler and said driver to bias said coupler into engagement with said pinion gear,
wherein when in said clutch first position, said first gear is rotationally coupled to said pinion gear, and when in said clutch second position, said pinion gear rotates with respect to said first shaft, and
wherein when said second handle is rotated, said coupler is moved into said clutch second position and releasably retained in said second position by said second pawl second portion.

15. The brake mechanism of claim 14, further comprising a spring coupled to said second pawl first portion, wherein said second pawl first portion is in contact with said first pawl and biases said first pawl into engagement with said first gear to rotationally fix said first gear in a first direction while ratcheting over said first gear in an opposite second direction.

16. The brake mechanism of claim 14, further comprising a bell crank mounted proximate said locking mechanism, wherein when said second handle is rotated, said locking mechanism biases said bell crank into engagement with said coupler to move said coupler into said clutch second position.

17. The brake mechanism of claim 14, further comprising a chain coupled between said second gear and the brake rigging of the railway car.

18. The brake mechanism of claim 14, wherein
a. said first shaft is threaded on an outer circumference thereon; and
b. said driver is threaded on an inner circumference thereon,
wherein said driver is threadedly coupled to said first shaft so that said driver moves axially along said first shaft threads over a limited distance.

* * * * *